(No Model.)
R. GREGG.
TOOL FOR WITHDRAWING BUSHINGS.
No. 511,610. Patented Dec. 26, 1893.
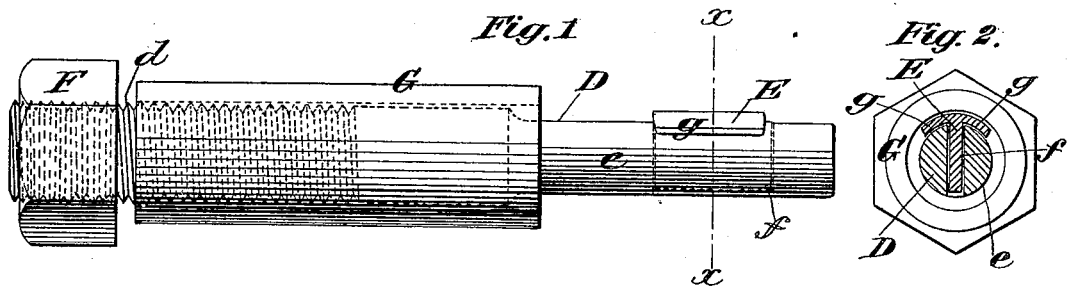
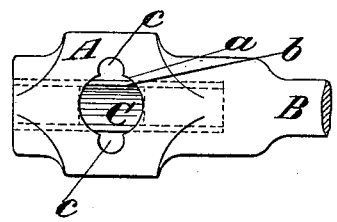
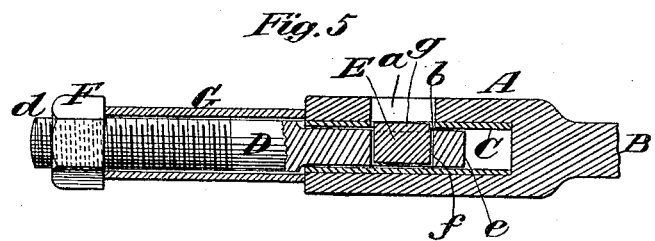
Witnesses:—
George Barry.
C. E. Sundgren.
Inventor
Richard Gregg
by attorneys
Brown & Seward

UNITED STATES PATENT OFFICE.

RICHARD GREGG, OF OSWEGO, ASSIGNOR TO THE INGERSOLL-SERGEANT DRILL COMPANY, OF NEW YORK, N. Y.

TOOL FOR WITHDRAWING BUSHINGS.

SPECIFICATION forming part of Letters Patent No. 511,610, dated December 26, 1893.

Application filed September 23, 1893. Serial No. 486,263. (No model.)

*To all whom it may concern:*

Be it known that I, RICHARD GREGG, of Oswego, in the county of Oswego and State of New York, have invented a new and useful Tool for Withdrawing Bushings, of which the following is a specification.

The object of my new tool is more especially the withdrawing of bushing from the chucks of rock drill pistons.

The nature of the improvement will be described with reference to the accompanying drawings and its novelty set forth in the claims.

Figure 1 represents a longitudinal view of the tool; Fig. 2 a transverse section of the same in the line $xx$ of Fig. 1. Fig. 3 is a front view of a chuck of the kind to which my invention is more particularly applicable, the clamping block and the U-shaped clamping bolt being omitted to expose a part of the bushing to view. Fig. 4 represents a face view of a key which constitutes an essential element of my invention. Fig 5 is a longitudinal central sectional view of the chuck and its bushing with my improved tool placed therein ready for operation.

Similar letters of reference designate corresponding parts in all the figures.

To explain more fully the object of my invention I will first briefly refer to Figs. 3 and 5 in which A designates the chuck formed on the end of the piston-rod B, and C designates the bushing which is fitted to the socket of the chuck for the reception of the shank of the drill which, together with the bushing, is to be secured in the chuck by a round clamping block and a U-shaped clamping bolt (not shown in the drawings), the said clamping block being inserted into a hole $a$ (Figs. 3 and 5) provided in the chuck and a corresponding hole $b$ provided in the bushing, and the U-shaped clamping bolt passing through holes $c\ c$ provided in the chuck and corresponding notches in the sides of the clamping block. Such a clamping block and clamping bolt are well known and are described and claimed in the patent of G. M. Githens, No. 307,641, dated November 4, 1884.

Referring now to Figs. 1 and 2 which represent my improved tool and to Fig. 5 which illustrates its use, D is a spindle, a portion $e$ of the length of which is of a size to enter freely into the bore of the bushing which is to be removed, the remaining portion being of larger diameter and screw-threaded from one end the greater portion of its length as indicated at $d$ in Figs. 1 and 5. The portion $e$ of this spindle has provided in it near one end thereof, a longitudinal slot $f$ for the reception of a key E which has a broad head $g$ projecting beyond the face of the spindle and overlapping it on each side of the slot, the thickness of said head being slightly less than the thickness of the bushing C and the said head conforming to a transverse section of the spindle as shown in Fig. 2, and also conforming to the interior of the bushing. On the screw-threaded portion $d$ of the spindle is a nut F and between the said nut and the key E a sleeve G is placed loosely on the spindle.

When the tool is to be used for withdrawing a bushing the clamping block, the U-shaped clamping bolt and the drill are all removed from the chuck leaving the latter in the condition shown in Figs. 3 and 5. The key E is then removed from the tool and the portion $e$ of the spindle is inserted into the bushing in place of the drill far enough to bring the slot $f$ opposite the hole $a$ in the chuck and the hole $b$ in the bushing, the sleeve G being between the nut F and the end of the chuck. The key E is then inserted through the hole $a$ in the chuck into the slot $f$ of the spindle and the hole $b$ of the bushing, as shown in Fig. 5, and after this the nut F is screwed up against the sleeve G and thereby caused to pull the spindle D from the chuck and as the head $g$ of the key E is engaged with the bushing through the hole $b$ therein, the bushing is drawn out from the chuck with the spindle.

What I claim as my invention is—

1. A tool for withdrawing bushings consisting of a spindle screw-threaded at one end and having a slot near the other end, a removable key so adapted to the slot as to project beyond the face of the spindle, a nut on the screw-threaded portion of the spindle and a sleeve fitted to the spindle between said nut and key, all in combination substantially as herein set forth.

2. The combination of the spindle D having a screw-thread $d$ on a portion of its length and having a portion $e$ thereof next one end of smaller diameter than said screw-threaded portion and having a slot $f$ in said portion $e$, the key E fitted to said slot and having a head which conforms to the spindle and overlaps the sides of said slot, the nut F on the screw-threaded portion of said spindle, and the sleeve G surrounding the spindle between said nut and key, all substantially as herein set forth.

RICHARD GREGG.

Witnesses:
JAMES R. WILLIAMS,
FRED. COMSTOCK.